US009162853B2

(12) United States Patent
Ives et al.

(10) Patent No.: US 9,162,853 B2
(45) Date of Patent: Oct. 20, 2015

(54) DRUM LOAD MONITORING

(75) Inventors: Sebastien Ives, Pearland, TX (US); Peter Fitzgerald, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 720 days.

(21) Appl. No.: 13/376,868

(22) PCT Filed: Jun. 17, 2010

(86) PCT No.: PCT/IB2010/052750
§ 371 (c)(1),
(2), (4) Date: Feb. 7, 2012

(87) PCT Pub. No.: WO2010/146565
PCT Pub. Date: Dec. 23, 2010

(65) Prior Publication Data
US 2013/0000892 A1    Jan. 3, 2013

Related U.S. Application Data

(63) Continuation of application No. 12/486,882, filed on Jun. 18, 2009, now abandoned.

(51) Int. Cl.
*G01L 5/04* (2006.01)
*B66D 1/58* (2006.01)
(Continued)

(52) U.S. Cl.
CPC . *B66D 1/58* (2013.01); *E21B 19/08* (2013.01); *E21B 47/00* (2013.01); *G01L 5/04* (2013.01)

(58) Field of Classification Search
CPC ......... E21B 47/00; E21B 19/08; E21B 47/04; G01B 21/028; G01L 5/04; G06F 19/00; G01V 11/00; B66D 1/58

USPC .............. 166/250.01, 379, 381, 65.1; 702/43, 702/6–13; 73/152.26, 152.02; 340/854.9, 340/854.1, 854.2; 175/27
See application file for complete search history.

(56) References Cited

U.S. PATENT DOCUMENTS 3,497,958 A * 3/1970 Gollwitzer ................. 340/854.1
3,552,025 A * 1/1971 Whitfill ..................... 340/854.1
(Continued)

FOREIGN PATENT DOCUMENTS

DE    19512103 A1    10/1996
EP    477948 A2    4/1992
(Continued)

OTHER PUBLICATIONS

Extended European Search Report for European Application No. 10789096.4 dated Oct. 15, 2013.

*Primary Examiner* — Yong-Suk (Philip) Ro
(74) *Attorney, Agent, or Firm* — Trevor Grove; Cathy Hewitt

(57) ABSTRACT

An assembly for monitoring load on a drum during an operation in a well with a well access line deployed from the drum. The assembly may include multiple line detection mechanisms for acquiring real-time information relative to dynamic characteristics of the lone over the course of the operation. The assembly also includes a processor for computing the real-time information in light of pre-stored information relative to physical characteristics of the line and the drum. As a result, real-time monitoring of a load on the drum may be achieved. Thus, the operation may be adjusted in real-time as necessary to avoid over-loading of the drum. Additionally, a drum load history may be recorded so as to better account for the true condition of the drum following successive operations.

11 Claims, 5 Drawing Sheets

(51) Int. Cl.
*E21B 19/08* (2006.01)
*E21B 47/00* (2012.01)

(56) References Cited

U.S. PATENT DOCUMENTS

| | | | |
|---|---|---|---|
| 4,265,110 A | 5/1981 | Moulin | |
| 4,282,523 A * | 8/1981 | Youmans | 340/854.1 |
| 4,633,720 A | 1/1987 | Dybel et al. | |
| 4,662,608 A | 5/1987 | Ball | |
| 4,976,143 A | 12/1990 | Casso | |
| 5,163,011 A | 11/1992 | Gunsallus | |
| 5,343,963 A | 9/1994 | Bouldin et al. | |
| 5,826,654 A * | 10/1998 | Adnan et al. | 166/250.01 |
| 6,536,519 B1 | 3/2003 | Vaynshteyn et al. | |
| 6,618,675 B2 * | 9/2003 | Strickland | 702/6 |
| 6,980,925 B2 | 12/2005 | Zheng et al. | |
| 7,444,861 B2 | 11/2008 | De Jesus et al. | |
| 7,644,607 B2 | 1/2010 | Michaelis | |
| 2004/0040707 A1 * | 3/2004 | Dusterhoft et al. | 166/279 |
| 2005/0072965 A1 | 4/2005 | Sanders et al. | |
| 2007/0113640 A1 * | 5/2007 | De Jesus et al. | 73/158 |

FOREIGN PATENT DOCUMENTS

| | | |
|---|---|---|
| EP | 1247778 A2 | 10/2002 |
| EP | 1670653 A1 | 6/2006 |
| EP | 1803040 A1 | 7/2007 |
| EP | 1818657 A2 | 8/2007 |

* cited by examiner

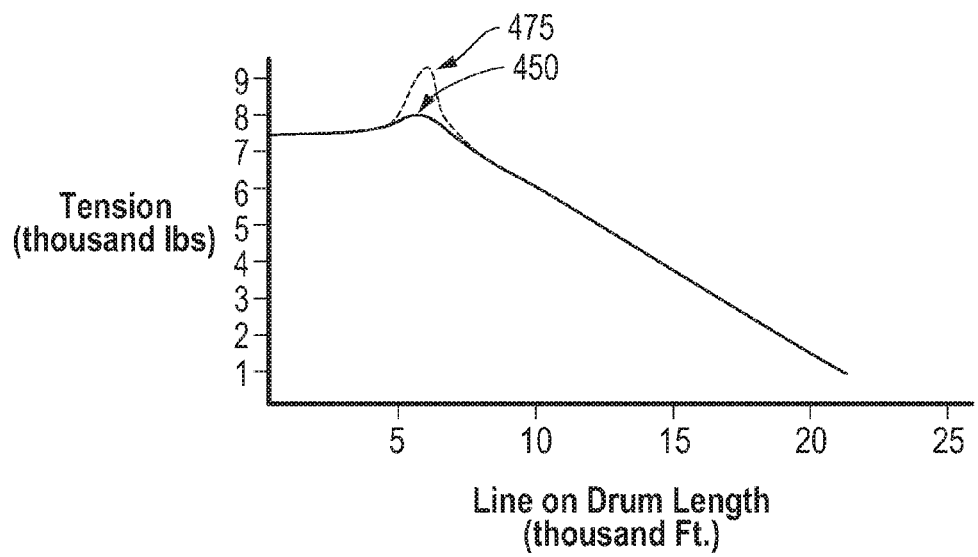
*FIG. 4A*
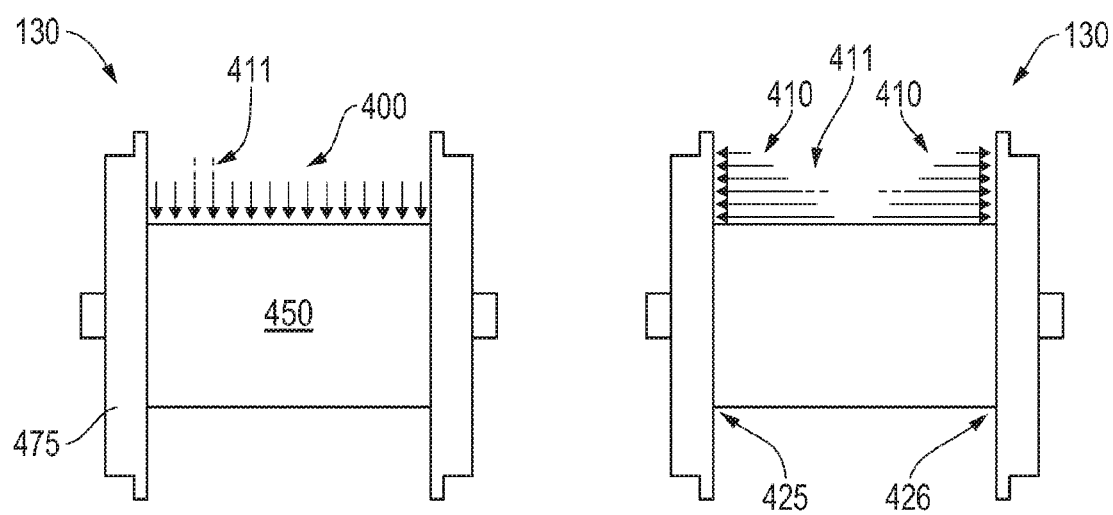
*FIG. 4B*  *FIG. 4C*

DRUM LOAD MONITORING

CROSS-REFERENCE TO RELATED APPLICATIONS

The current application is a 371 of PCT/IB2010/052750, which was filed on Jun. 17, 2010, and which is a continuation of U.S. patent application Ser. No. 12/486,882, filed on Jun. 18, 2009. The entirety of the foregoing applications are incorporated herein by reference.

FIELD

Embodiments described relate to drum assemblies for delivering a well access line and downhole tools thereon to a well. Such well access line may include wireline cables, slickline and others. Additionally, a drum assembly may include monitoring equipment and techniques directed at keeping track of a load imparted on the drum in real-time during a given downhole operation. Furthermore, a drum history keeping track of load relative to the drum over a number of successive operations may be maintained.

BACKGROUND

Exploring, drilling and completing hydrocarbon and other wells are generally complicated, time consuming and ultimately very expensive endeavors. As such, tremendous emphasis is often placed on well access in the hydrocarbon recovery industry. That is, access to a well at an oilfield for monitoring its condition and maintaining its proper health is of great importance in the industry. As described below, such access to the well is generally provided by a well access line accommodated by a drum positioned at the oilfield.

During monitoring and maintaining of a well, a host of oilfield equipment may be located at the oilfield near the well. As indicated, one such piece of equipment may be a drum assembly accommodating a well access line. The well access line itself is generally a wireline cable or slickline configured to secure a well tool at a downhole end thereof. Alternatively, the drum may be a "reel" of coiled tubing line capable of delivering a fluid therethrough and to the well. In the case of coiled tubing, the line may be threaded through an injector arm and into the well, whereas the more conventional wireline or slickline may be dropped into the well from a mast over the well. Regardless, several thousand feet of line may ultimately be deployed from the drum and delivered into the well, thereby providing well access for a variety of well monitoring and maintenance procedures.

Unfortunately, the several thousand feet of line wrapped about the drum assembly tends to take its toll on the drum. That is, the drum may be subjected to the pressure or load of the line itself simply by having the line wrapped thereabout. Additionally, over the course of well access operations as described above, tension on the line may increase the load on the drum. This may particularly be the case when the drum is directed by a winch to pull the line in an uphole direction, for example, at the conclusion of an operation. In such circumstances, the line may face obstacles which impede the uphole movement thereof, such as obstructions or bends in the well architecture. Regardless, when such obstacles are presented, the load imparted on the drum through the increase in tension on the line may be quite significant.

Drums for well access operations, such as wireline operations, are generally constructed to withstand significant amounts of load. Nevertheless, the cumulative effects of such high tension and resulting high load as noted above may lead to plastifying of the drum, which may leave the drum ineffective for proper use in well access operations. The drum is particularly susceptible to plastifying of this nature at a junction of its core, about which the line is wrapped, and the wall-like flanges at the sides thereof, which help to retain the line in position about the core. Unfortunately, once rendered ineffective in this manner, the drum may be replaced at a cost that is often in excess of $80,000 or more in today's dollars.

Furthermore, the frequency of drum replacement for well access operations has risen sharply in the last several years and is likely to continue rising. This is a result of the sophisticated wells which are becoming more and more common. That is, in today's hydrocarbon recovery industry, deeper and deeper wells are regularly employed which require a greater amount of line for access. In some cases, the line may exceed 30,000 feet or more. This naturally places a greater amount of load on the drum from the outset, even before any of the line is deployed. Additionally, highly deviated and tortuous wells are becoming more and more common. As a result, the tension of the line on the drum is increased due to the added amount of friction and fluid resistance that accompany wells of such complicated architecture. All in all, the life expectancy of a conventional drum regularly employed in such high tension operations is significantly reduced.

Efforts have been made to minimize the load imparted on the drum during a given well access operation. One such effort is to employ an expected tension or load profile which is established in advance of the operation. So, for example, in the case of a particularly tortuous well, retrieval of the line may proceed in a manner that accounts for a toolstring rounding a bend in the well or other predictable occurrences that may be accounted for by the profile. Thus, the parameters of the retrieval may be adjusted to account for the line pulling the toolstring equipment around the bend.

Unfortunately, many of the factors which lead to an increase in tension on the line may not be built into an expected load profile. That is, much of what causes tension on the line is a matter of the 'unexpected'. For example, the expected load profile would not account for unknown obstructions or unexpected changes in pressure that result in differential sticking. Thus, advance warning is not always available. Furthermore, there remains an absence of real-time drum load monitoring to address this issue. This is due to mechanical interfacing challenges presented by the prospect of directly monitoring a load on a rotating drum. Additionally, in circumstances where the drum does make it through the operation in spite of concerns over potentially exceeded load thresholds, other concerns remain. For example, due to the lack of direct drum load information, no reliable load history is preserved for the drum. As a result, rather than risk a catastrophic event during operation, the drum is most likely discarded after a given number of uses irrespective of its actual structural condition.

SUMMARY

An assembly for monitoring a load on a drum is provided. The assembly may include a line monitoring mechanism that is coupled to a line that is deployed from the drum. A processor having pre-loaded drum data stored thereon may be coupled to the line monitoring mechanism so as to allow for a running of drum load computations based on the drum data and the line data.

A method of monitoring a load on a drum is provided. The drum may be configured to accommodate a line for access to a well. Drum information indicative of physical characteristics of the drum may be stored on a processor and the line positioned within the well. Line information indicative of physical characteristics of the line may be acquired during the positioning thereof within the well. Additionally, the processor may be employed to dynamically compute the load on the drum during the positioning based on the available line and drum information.

BRIEF DESCRIPTION OF THE DRAWINGS

FIG. 4A is a chart depicting variation in a monitored load from the tension of a well access line that is directed at a drum over the course of a well access operation.

FIGS. 4B and 4C are side views of the drum referenced in 4A revealing the site specific pressure distribution imparted by the monitored load.

DETAILED DESCRIPTION

Embodiments are described with reference to certain drums and well access operations. For example, an embodiment of a particular wireline logging operation is depicted and described throughout. However, a variety of different types of well access operations may employ embodiments of drum load monitoring tools and techniques as detailed herein. Regardless, embodiments described herein include line detection mechanisms for detecting line length and tension, along with a processor coupled to the mechanisms that also has pre-stored drum data thereon.

Figure 1:
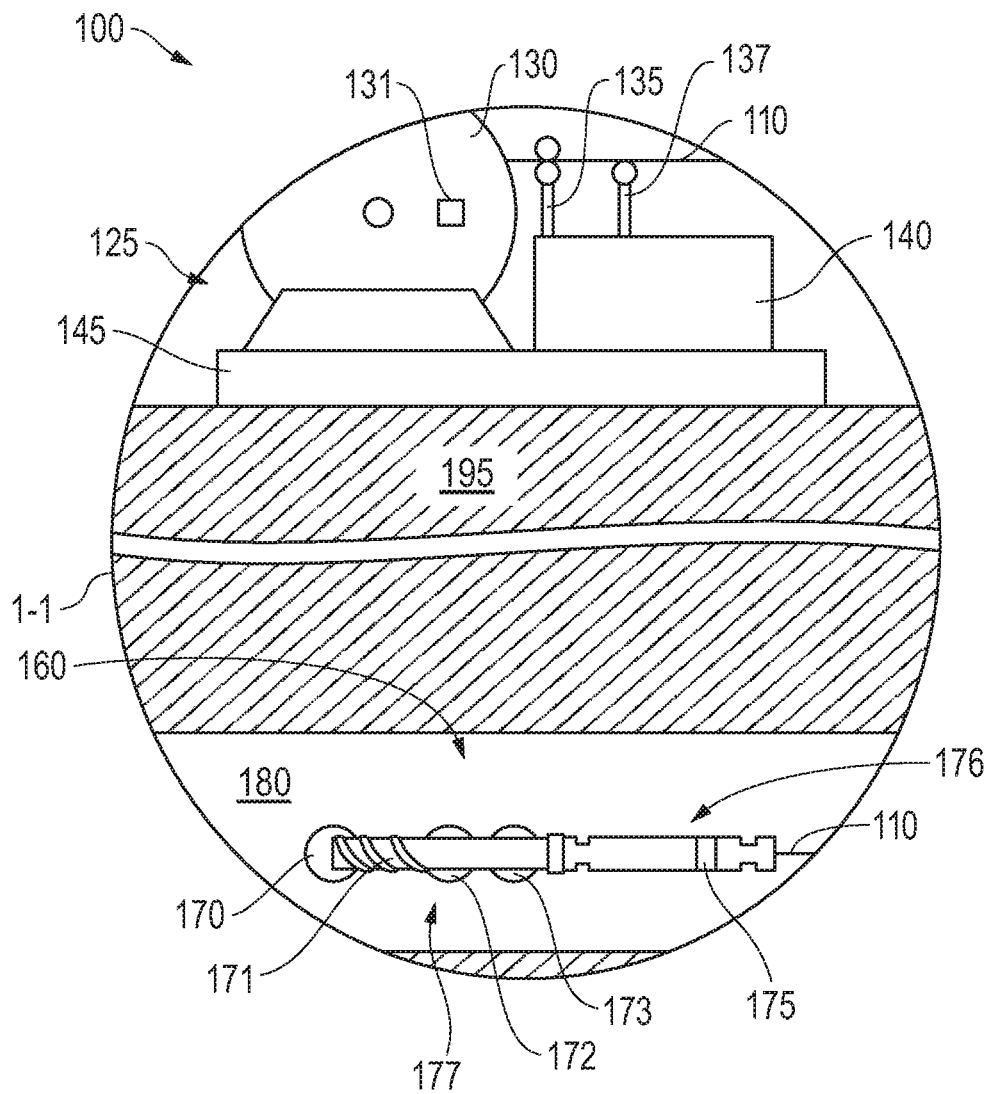
FIG. 1 is an enlarged view of an embodiment of a drum load monitoring assembly taken from 1-1 of FIG. 2.

Referring now to FIG. 1, an embodiment of a drum load monitoring assembly 100 is shown. FIG. 1 is an enlarged view of the assembly 100 taken from 2-2 of FIG. 2 which shows a larger overview of the assembly 100 positioned at an oilfield 297. In the embodiment shown, the assembly 100 is positioned for wireline operations. More specifically, a well access line 110 in the form of a wireline is deployed into a well 180 with a logging tool 177 secured thereto for logging operations. However, in other embodiments a variety of other downhole operations may proceed as noted above.

The above noted line 110 is deployed from a drum 130 of deployment equipment 125. As shown, the deployment equipment 125 includes a skid 145 for accommodating the drum 130 along with a processing unit 140. Additionally, a line tension detection mechanism 137 and a line length detection mechanism 135, such as an integrated depth wheel (IDW) are also provided. In the embodiment shown, these mechanisms 135, 137 are situated at the processing unit 140 so as to interface the well access line 110 while also coupling to a processor of the processing unit 140. Thus, tension and length information relative to the line 110 may be transmitted to the processor so as to determine load on the drum 130 during the operation. This technique for monitoring the load on the drum 130 is detailed further below.

Continuing with reference to FIG. 1, the length detection mechanism 135 is configured to meter the amount of line 110 that is deployed into and out of the well 180 during an operation such as the depicted logging operation. Similarly, the tension detection mechanism 137 may be a strain gauge based device configured to detect the tension on the line 110 throughout the operation. With brief added reference to FIG. 3A, these mechanisms directly interface the line 110 so as to pass line information (310, 320) to the processor of the processing unit 140. In turn, the processor may be pre-loaded with certain drum and line character information that, when analyzed as shown at 330 in light of the acquired line information, may ultimately reveal drum load in real-time over the course of the operation (see 340).

In the embodiment shown, the tension detection mechanism 137 is positioned near the drum 130. This may serve to approximate the tension imparted on the drum 130 by the line 110 with significant precision. Indeed, in another embodiment, the tension detection mechanism 137 may be incorporated into the length detection mechanism 135. Alternatively, a logging head 176 coupled to the line 110 in the well 180 may be equipped with a sensor 175 to serve as a tension detection mechanism. In yet another embodiment, tension may be measured from multiple locations, including a location associated with a capstan at the surface of the oilfield 297 (see FIG. 2). Whatever the case, the tension detection mechanism 175 (or mechanisms) may be configured to directly couple to the line 110 to detect tension, while simultaneously being communicatively coupled to the processor and/or processing unit 140. Such communicative coupling may even be wireless.

As shown in FIG. 1, and alluded to above, logging equipment 160 is deployed in the well 180 for a logging operation. This may include deploying the equipment 160 several thousand feet into a formation 195 through a well 180. Indeed, in the embodiment shown, the well 180 may be of a deviated character which often adds to the load imparted on the drum 130 during retrieval of the line 110 as described further below. Additionally, the logging tool 177 may be equipped with diagnostic implements such as ejector 171 and saturation 173 implements to obtain water flow information. Additionally, an imaging implement 172 may be provided as well as a fullbore spinner 170 to measure fluid velocity.

Figure 2:
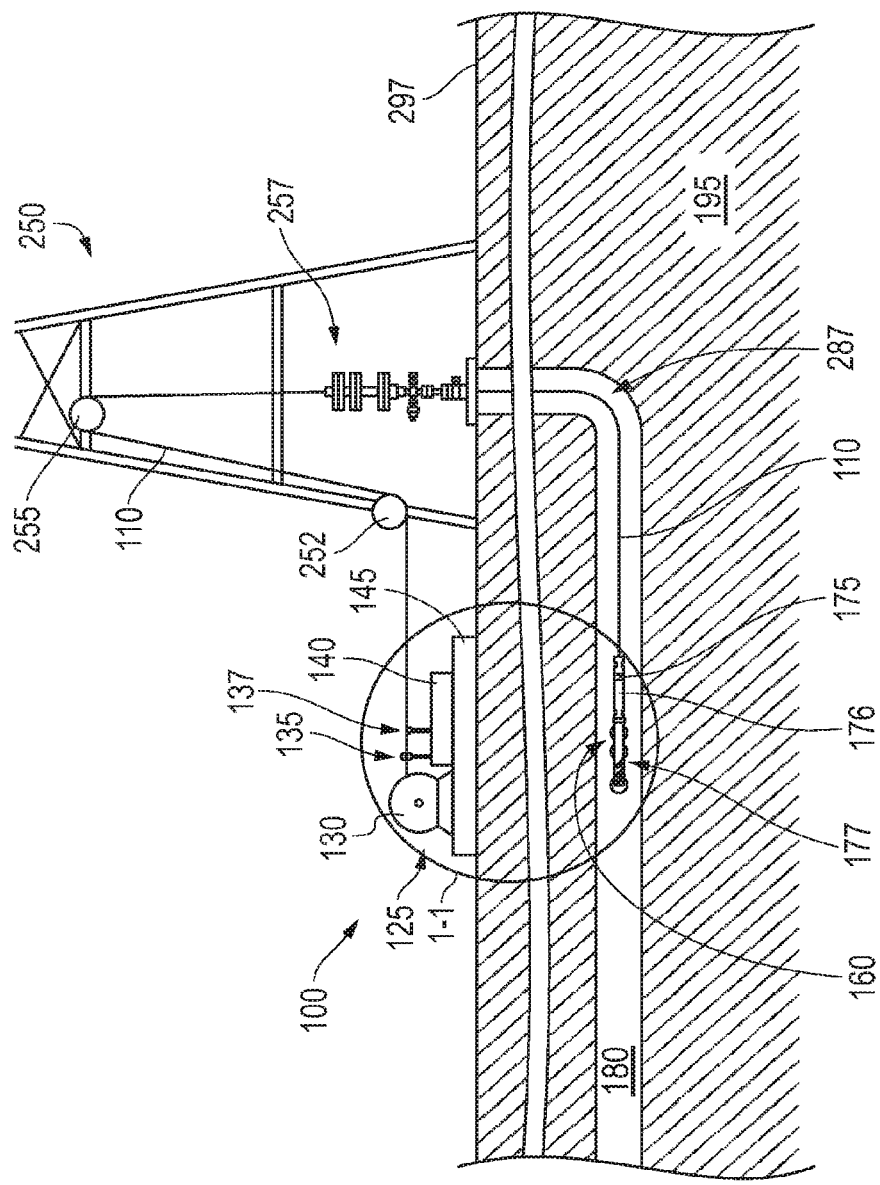
FIG. 2 is an overview of the drum load monitoring assembly of FIG. 1 positioned at an oilfield for a well access line operation.

Referring now to FIG. 2, the assembly 100 is shown in the context of a larger overview of an oilfield 297 where logging and other operations may take place relative to the well 180. As shown in FIG. 2, the well access line 110 is directed from the drum 130 toward a larger rig 250 from which it may be advanced into the well 180. More specifically, the line 110 is strung about lower 252 and upper 255 sheaves and threaded through pressure control equipment 257 positioned over the well 180.

From the view of FIG. 2, the tortuous nature of the well 180 is apparent. For example, the well 180 extends vertically through the formation 195 below pressure control equipment 257 at the surface of the oilfield 297. This vertical portion of the well 180 may extend for several thousand feet, until reaching a bend 287. At this point, the well 180 may extend in a deviated or horizontal manner as depicted. With such an architecture, the load imparted by the logging equipment 160 and line 110 may be of concern as the equipment 160 is eventually pulled uphole. That is, while the depth of the well 180 alone may present a challenge to the drum 130 in terms of accommodated load, its tortuous nature may provide even more concern, particularly when it comes to pulling the equipment 160 uphole around the bend 287. This may also be of concern when being advanced past the bend 287, for example, through the aid of a tractor (not shown).

With such drum load concerns in mind, the assembly 100 is configured to establish load on the drum 130 in a real-time manner, without sole reliance on a pre-set expected load or tension profile. With particular reference to the well 180 and operations in the depicted embodiment, this means that the equipment 160 may be pulled uphole following logging or in conjunction therewith. As the equipment 160 is pulled uphole, real-time information may be continuously fed to the processing unit 140. As indicated above, this information may relate to the tension on the line 110 (as acquired by the tension detection mechanism 137) as well as the position or depth of the line 110 (as acquired by the length detection mechanism 135). Thus, given the pre-loaded drum and line information stored on the processor of the processing unit 140, the load imparted on the drum 130 may be established at all times throughout the operation.

With real-time drum load information available, evasive or corrective action may take place upon approaching a pre-determined drum load threshold, also referred to as a maximum bending momentum. So, for example, depending on the particular type of drum 130 employed, a load threshold may be established. The load threshold may be based on a maximum bending momentum in the core/flange junction and on a maximum pressure on the core (discussed in more detail below) and may be defined in terms of force, and may be, but is not limited to, 9,000 lbs or more. In such an embodiment, any real-time detection by the assembly 100 of a load equal to or greater than the load threshold on the drum 130 may result in slowing down or shutting off of the uphole advancement of the equipment 160. In the embodiment shown, this may be prone to occur at the bend 287. However, this is not a certainty, nor is the precise location of the bend 287. Nevertheless, the assembly 100 is employed to make such a determination through direct monitoring in real-time so as to provide a degree of reliability previously unavailable. Thus, the operator is not limited to what may be gathered from an expected load or tension profile which may be out of date or less than accurate.

Figure 3A:
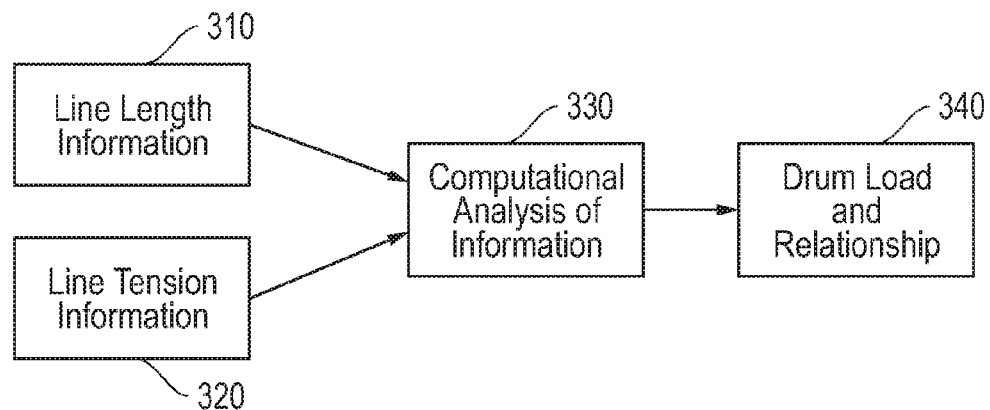
FIG. 3A is a schematic representation of an embodiment of a drum load monitoring assembly analyzing information inputs to establish drum load.

Referring now to FIG. 3A, a schematic representation of drum load monitoring according to embodiments described above is shown. Namely, a processor is employed to run computational analysis as indicated at 330. The analysis is based on information that may be pre-loaded into the processor, such as the amount of line on the loaded on the drum and its expected tension profile. Other line characteristics such as diameter, stretch profile, and history (i.e. prior usage of the line) may similarly be pre-loaded. Additionally, the type of drum in terms of materials and architecture, its dimensions, history and other characteristics are also pre-loaded. Once an operation commences, real-time information regarding line length and tension may then be fed to the processor during the operation as noted at 310 and 320. With these various types of information on hand, the processor may employ conventional algorithmic techniques to establish the load on the drum during the operation.

As indicated at 340, the load determination may be established in real-time during an operation. As detailed above, this may allow the operation to be adjusted or halted altogether in response to a real-time determination of the drum load exceeding a predetermined load threshold. Furthermore, the determination of load may include specifically identifying the relationship of the load relative to the physical morphology of the drum (see 340). That is, as detailed further below with reference to FIGS. 4B and 4C, load at particularly impacted locations of the drum 130 may be established through techniques detailed herein.

Figure 3B:
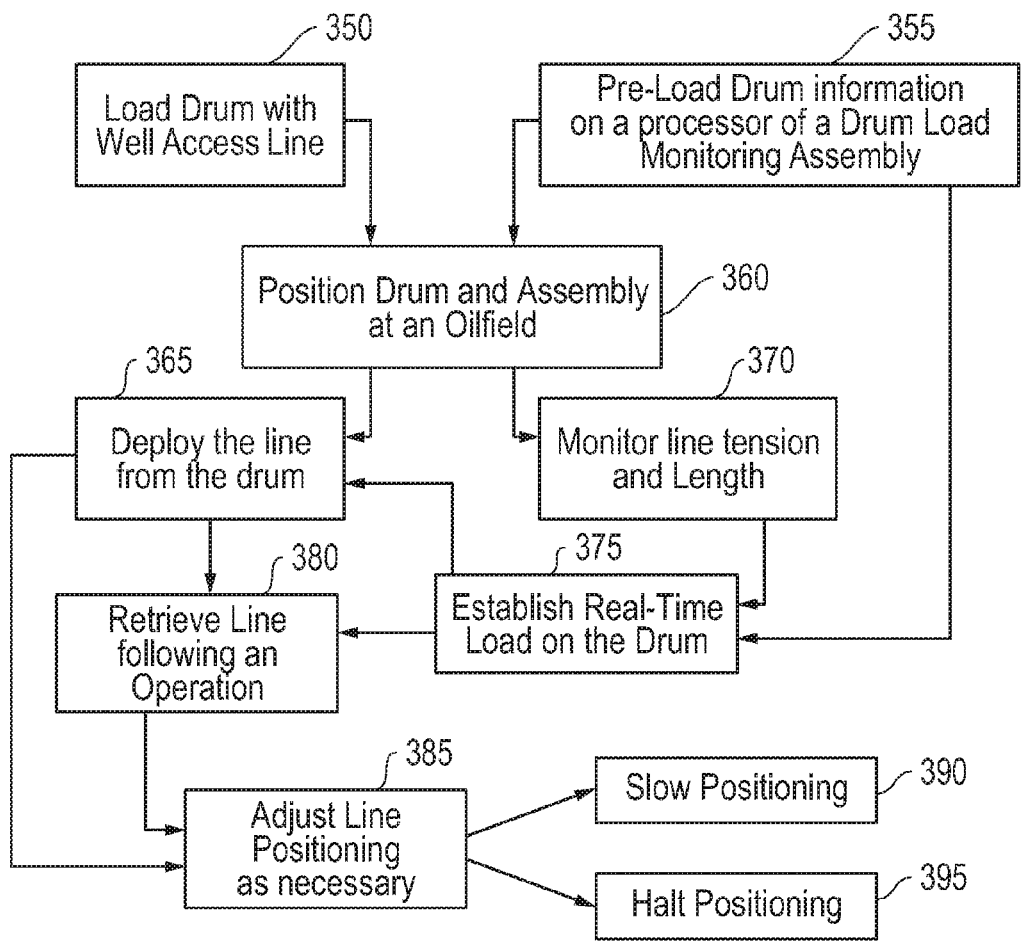
FIG. 3B is a flow-chart summarizing an embodiment of establishing drum load in real-time during a well access operation.

Referring now to FIG. 3B, a flow-chart is shown which provides a larger overview of an embodiment of establishing drum load in real-time. As indicated at 350, well access line is wound about the drum and drum information is pre-loaded on a processor of the drum load monitoring assembly (see 355). As noted above, additional information related to characteristics of the line may also be pre-loaded on the processor either before, during, or after the well access line is wound about the drum including, but not limited to, the expected tension profile of the well access line. Other pre-loaded information may include, but is not limited to, maximum number of cycles for the drum and the number of cycles performed with the drum. Once line and information pre-loading is completed, the drum and assembly may be positioned at the oilfield as indicated at 360. As such, the line and operation equipment may be deployed into a well at the oilfield as indicated at 365.

From the time the line is drawn from the drum, its tension and length may be monitored as indicated at 370 by the drum load monitoring assembly. Thus, real-time data may be fed to the processor from the outset of operations until the line is retrieved from the well (see 380). As a result, real-time load on the drum may be monitored throughout operations as indicated at 375. That is, with pre-loaded information available relative to drum and line characteristics, the processor is able to establish real-time drum load from the dynamic line length and tension data that is acquired. Therefore, should drum load concerns be detected, line positioning may be adjusted as noted at 385.

So, for example, where a real-time load on the drum is detected that approaches a pre-determined load threshold for the drum, the positioning of the line may be slowed (e.g. 390) or halted altogether (e.g. 395). This may be more likely to occur during uphole retrieval of the line and other operation equipment (e.g. such as where the equipment rounds a bend 287 as depicted in FIG. 2). However, drum load concerns may arise at any time. For example, where a tractored deployment of equipment downhole is utilized, unexpected obstructions and other obstacles may arise that are prone to increase the load on the drum. When this occurs, it may be safer to slow the rate of line and equipment positioning as noted at 390 or even to halt the operation altogether as noted at 395. That is, in certain circumstances, even halting operations followed by subsequent fishing may be more prudent and less costly than risking loss of the drum due to excessive load thereon.

In addition to establishing drum load as noted above, the processor may provide additional calculations as a result of having the pre-loaded and real-time information available. For example, the processor may be employed to keep track of the number of wraps of the line about the drum as well as the center of each wrap. Calculations may be made regarding tension loss factor and ultimately, a two or three dimensional mapping of the load on the drum 130 may be established. This mapped load may reveal locations of pressure relative to the core 450, flanges 475 or junctions 425, 426 of the drum 130 (see FIGS. 4B and 4C).

Referring now to FIG. 4A, a chart is shown which depicts the variation in load imparted on a drum over the course of an operation. As indicated, the load is a result of tension imparted through a well access line to its associated drum. In the embodiment shown, the drum is rated to reliably operate at up to the load threshold. Thus, keeping the load imparted on the drum at below the load threshold may help avoid drum damage. With brief added reference to FIGS. 4B and 4C, the load imparted on the drum 130 during the operation of FIG. 4A may be visually represented with two dimensionally mapped pressure points 400, 410, 411.

Continuing now with reference to FIG. 4A, the chart begins at the left with the line disposed in the well for operations similar to that of FIGS. 1 and 2. Notice the minimal to none 'line on the drum length' at the far left of the x-axis. At this point, the load on the drum is shown as a little over about 7,000 lbs. The chart continues to the right as the drum is employed to retrieve well access line and increase the 'line on the drum length'. With added reference to FIG. 2, this retrieval of the line 110 may continue until the equipment 160 reaches the bend 287 in the well 180. At this point the load on the drum 130 may spike up a bit (as noted at 450). However, as detailed above, the increase in load is detected in real-time. Thus, to the retrieval speed of the line 110 and equipment 160 may also be adjusted at just the right time so as to prevent the load on the drum from spiking above the load threshold (see 475) as might otherwise be the case. The remainder of the line 110 may then be pulled up through the vertical section of the well 180. At this point, the line 110 on the drum 130 steadily builds while its load thereon steadily reduces.

Continuing now with reference to FIGS. 4B and 4C, a side view of the drum 130 is shown that reveals a map of site specific pressure distribution of the load resulting from the operation of FIG. 4A. Specifically, the load on the core 450 is shown by vertical pressure 400 whereas horizontal pressure 410 is imparted on the flanges 475. As depicted, the greater the amount of pressure 400, 410, the larger the corresponding arrow. For example, notice that the horizontal pressure 410 on the flanges 475 is greatest nearer the core 450 and generally less and less with each successive wrap of line thereabove. In one embodiment, the core 450 and flange 475 forces may be graphically presented to an operator as a matter of user-friendliness. As such, the operator will be able to monitor the load on different parts of the drum 130 at any given moment of the operation. For example, FIGS. 4A and 4B reveal two dimensional mapping with all pressure 400, 410, 411 depicted above the core 450. However, a three dimensional rendering of pressure 400, 410, 411 fully distributed about the core 450 may also be generated.

Continuing with reference to FIGS. 4A and 4B, the map of pressure reveals a couple of noteworthy pressure revelations. For example, irrespective of load monitoring as described herein, the drum 130 is subjected to the greatest amount of pressure at the junctions 425, 426 of the core 450 and flanges 475. This is where the greatest amount of horizontal pressure 410 meets up with a generally consistent amount of vertical pressure 400. Nevertheless, as operations proceed, load monitoring may be employed to minimize vertical and horizontal pressure spikes 411 (e.g. as equipment 160 rounds a bend 287 as described above and with respect to FIG. 2).

Indeed, as shown in FIGS. 4A and 4B, a fairly precise depiction of the two dimensional location of pressure spikes 411 may be provided. For example, as depicted, the pressure spikes 411 are imparted on the drum 130 by line that is wrapping nearer the left core-flange junction 425 at a few layers up relative to the core 450. As such, a more informative account of the load may be provided. Indeed, as described below, the accounting of the load may be both more informative and maintained over time thereby providing a more accurate reflection of the condition of the drum 130 throughout its life.

Figure 5:
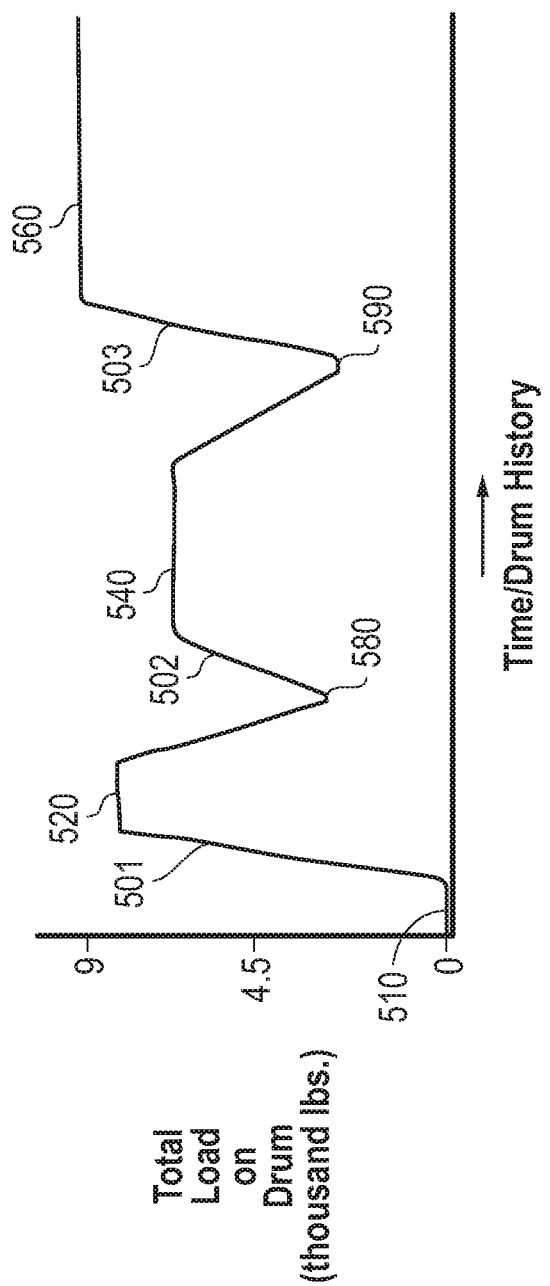
FIG. 5 is a chart depicting drum history in terms of total load over the course of successive well access operations.

Referring now to FIG. 5 a chart is shown depicting drum history in terms of total load over the course of different well access operations. So, for example, the drum may initially be provided free of any well access line as indicated at 510 where the total load is 0. The drum may be equipped with line thereabout according to a given tension profile as indicated at 501. As shown at 520, the loaded drum may then be stored or sent to an operation site with a load of under about 9,000 lbs. During an operation, line deployment into a well may initially reduce the load as indicated at 580. However, subsequent retrieval of the line as indicated at 502 is likely to once again increase the imparted load (see 540). Similarly, a subsequent deployment of the line in later operations may reduce the load as noted at 590. However, the retrieval of the line as shown at 503 is likely to once again increase the load. Indeed where subsequent operations are in a more tortuous well, the retrieval of the line may impart a greater load than before (see 560).

With such a drum load history available as depicted in FIG. 5, the operator is able to make informed decisions about whether or not to utilize a given previously used drum for a given operation. That is, through conventional tagging, barcoding, RFID or other identifying techniques, the cumulative history of a given drum may be readily brought up for the operator's review. The data and/or cumulative history of a given drum may also be stored on a memory device 131, best seen in FIG. 1 attached to the drum 130 (for example with some sort of non-volatile memory including, but not limited to, flash memory devices or the like), as will be appreciated by those skilled in the art. The memory device 131 may be in communication with or otherwise communicatively coupled to the processor and/or processing unit 140. Such communicative coupling may even be wireless. The memory device 131 may be at least a source of pre-loaded information stored in memory of processor. Thus, odds are reduced of bypassing or discarding a costly drum before necessary or accidentally employing a previously overstressed drum. In addition, having defined a maximum number of cycles that a drum can withstand, the number of logging cycles performed on the drum may be controlled, in order to be able to retire the drum before reaching this limit.

Embodiments described hereinabove provide for the establishment of a real-time drum load profile that is actual as opposed to 'expected'. Thus, the unexpected may be accounted for in real-time and recorded for future use. Such actual real-time drum load monitoring is achieved in a reliable manner without requiring mechanical interfacing relative to a rotating drum during operations. Nevertheless, the load imparted during operations may even be roughly mapped in a two or three dimensional manner relative to different regions or locations on the drum.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, as opposed to wireline, coiled tubing and/or slickline may serve as a well access line for embodiments of load monitoring as described herein. Furthermore, the foregoing description should not be read as pertaining only to the precise structures described and shown in the accompanying drawings, but rather should be read as consistent with and as support for the following claims, which are to have their fullest and fairest scope.

We claim:

1. An assembly for delivering downhole equipment to a well at an oilfield, the assembly comprising:
   a drum for positioning at the oilfield adjacent the well;
   a well access line coupled to said drum for accessing the well with the downhole equipment;
   a line length detection mechanism for positioning at the oilfield for interfacing said well access line to meter an amount thereof in the well;
   a line tension detection mechanism coupled to said well access line to monitor a tension thereof; and a processor having a pre-loaded drum and line characteristic data stored thereon and coupled to said mechanisms to acquire information relative to the metered amount and the monitored tension, said processor configured to run a computation of the pre-loaded characteristic data and the acquired information for real-time monitoring of load on the drum.

2. The assembly of claim 1 wherein said well access line is a wireline cable.

3. The assembly of claim 1 wherein the downhole equipment comprises a logging tool secured to the well access line.

4. The assembly of claim 1 wherein the well is of a deviated character.

5. A method of monitoring a load on a drum accommodating a line for access to a well, the method comprising:
- storing pre-loaded drum and line information on a processor, the information indicative of physical characteristics of the drum and line;
- positioning the line within the well;
- acquiring line information during said positioning, the line information indicative of dynamic characteristics of the line; and
- employing the processor to compute the load on the drum in real-time during said positioning from the pre-loaded information and the acquired information.

6. The method of claim 5 wherein the dynamic characteristics comprise line length and tension.

7. The method of claim 5 further comprising adjusting a rate of said positioning based on the computed load.

8. The method of claim 5 further comprising halting said positioning based on a computed load in excess of a predetermined load on the drum.

9. A method comprising:
- employing a drum to provide a well access line to a well;
- monitoring a load on the drum in real-time during said employing;
- maintaining a load history of said monitoring;
- storing pre-loaded information on a processor relative to physical characteristics of the drum and the well access line;
- acquiring dynamic information relative to the line during said employing; and
- computing the load in real-time during said employing based on the pre-loaded information and the dynamic information.

10. The method of claim 9 wherein said maintaining comprises:
- establishing a record of the load; and
- labeling the drum for association with the record.

11. The method of claim 9 wherein said maintaining comprises:
- storing at least the load history on a memory device attached to the drum.

* * * * *